(12) United States Patent
Brinkley et al.

(10) Patent No.: US 10,124,844 B2
(45) Date of Patent: Nov. 13, 2018

(54) SYSTEM AND METHOD FOR SUPPLYING FLUID TO A TRACK DRIVE BOX OF A WORK VEHICLE

(71) Applicant: CNH Industrial America, LLC, New Holland, PA (US)

(72) Inventors: Jerry L. Brinkley, Woodridge, IL (US); Bryan Nannet, Aurora, IL (US); Robert Muir, Willow Springs, IL (US)

(73) Assignee: CNH Industrial America LLC, New Holland, PA (US)

( * ) Notice: Subject to any disclaimer, the term of this patent is extended or adjusted under 35 U.S.C. 154(b) by 309 days.

(21) Appl. No.: 14/697,722

(22) Filed: Apr. 28, 2015

(65) Prior Publication Data

US 2016/0318564 A1 Nov. 3, 2016

(51) Int. Cl.
*B62D 55/092* (2006.01)
*F16H 57/04* (2010.01)
*B62D 55/06* (2006.01)

(52) U.S. Cl.
CPC .......... *B62D 55/092* (2013.01); *B62D 55/06* (2013.01); *F16H 57/0447* (2013.01)

(58) Field of Classification Search
CPC .... B62D 55/092; B62D 55/06; F16H 57/0447
USPC ........ 305/117, 100, 103, 118, 201, 202, 203
See application file for complete search history.

(56) References Cited

U.S. PATENT DOCUMENTS

| | | | |
|---|---|---|---|
| 3,367,410 A | 2/1968 | Kendrick | |
| 3,427,078 A * | 2/1969 | Parsons | B62D 55/08 180/9.52 |
| 3,895,845 A | 7/1975 | Hale | |
| 4,293,983 A | 10/1981 | Van Deusen et al. | |
| 4,428,445 A | 1/1984 | Zaunberger | |
| 4,529,061 A * | 7/1985 | Glasrud | F16H 57/0447 184/103.1 |
| 4,548,442 A | 10/1985 | Sugden et al. | |
| 4,899,841 A * | 2/1990 | Hawbaker | E02F 9/028 144/4.1 |
| 5,099,715 A * | 3/1992 | Baiker | F16H 57/0413 184/6.12 |
| 5,655,506 A * | 8/1997 | Hollis | F01P 3/20 123/556 |
| 5,662,188 A * | 9/1997 | Ito | B62D 5/07 184/11.1 |
| 6,032,754 A | 3/2000 | Izumi et al. | |

(Continued)

*Primary Examiner* — S. Joseph Morano
*Assistant Examiner* — Jean W Charleston
(74) *Attorney, Agent, or Firm* — Rickard K. DeMille; Rebecca L. Henkel (57) ABSTRACT

A system for supplying fluid within a work vehicle may generally include a track drive box including first and second inlet ports and an outlet port. The system may also include a first supply conduit in fluid communication with the first inlet port and a second supply conduit in fluid communication with the second inlet port. The first supply conduit may be configured to supply a working fluid to the track drive box and the second supply conduit may be configured to supply a pressurized fluid to the track drive box, wherein the pressurized fluid serves to pressurize an interior of the track drive box, Additionally, the system may include an evacuation conduit in fluid communication with the outlet port that is configured to receive the working fluid as it is expelled from the outlet port.

9 Claims, 4 Drawing Sheets

(56) References Cited

U.S. PATENT DOCUMENTS

| | | |
|---|---|---|
| 6,308,621 B1 | 10/2001 | Douillard et al. |
| 6,981,855 B2 | 1/2006 | Leppanen |
| 7,290,514 B2 | 11/2007 | Hoi |
| 7,543,668 B1 * | 6/2009 | Schechter ................ B60K 6/12 |
| | | 180/165 |
| 7,543,695 B2 | 6/2009 | Redelman et al. |
| 8,056,662 B2 | 11/2011 | Schoon et al. |
| 8,100,210 B2 | 1/2012 | Takeuchi et al. |
| 8,631,771 B2 | 1/2014 | Arnott |
| 8,744,722 B2 | 6/2014 | Bernier et al. |
| 9,046,002 B2 * | 6/2015 | Homeyer ................ F01D 21/00 |
| 2002/0153773 A1 | 10/2002 | Yoon |
| 2004/0031631 A1 * | 2/2004 | Pichler .................... B60K 5/04 |
| | | 180/68.3 |
| 2012/0118272 A1 | 5/2012 | Rohs et al. |

* cited by examiner

SYSTEM AND METHOD FOR SUPPLYING FLUID TO A TRACK DRIVE BOX OF A WORK VEHICLE

FIELD OF THE INVENTION

The present subject matter relates generally to track-driven work vehicles and, more particularly, to a system and method for supplying fluid to a track drive box of a work vehicle to provide cooling and/or lubrication within the drive box.

BACKGROUND OF THE INVENTION

Current work vehicles, such as tractors and other agricultural vehicles, include an electronically controlled engine and a transmission, such as a power shift transmission (PST) or a continuously variable transmission (CVT), coupled to the engine. The transmission is, in turn, coupled to at least one drive axle assembly for transferring torque from the transmission to the vehicle's wheels or tracks. For track-driven vehicles, a track drive box or gearbox is typically rotationally coupled to the drive axle assembly for transferring the torque transmitted through the axle assembly to a drive wheel of each of the vehicle's drive track assemblies. As is generally understood, the drive wheel is rotationally engaged with a corresponding endless track such that rotation of the drive wheel rotates the track, thereby allowing the vehicle to be driven forward or backward.

Current track drive boxes are configured as separate components that are fluidly isolated from the remainder of the drivetrain components. As a result, these self-contained drive boxes rely solely on the fixed amount of oil initially provided therein to provide lubrication and cooling for the various gears and/or other drive components contained within each drive box. Unfortunately, it has been found that this fixed amount of oil often provides inadequate cooling, thereby leading to excessive oil temperatures within each track drive box that can result in damage occurring to one or more of the internal drive components of the drive box.

Accordingly, a system and method for supplying or circulating fluid to a track drive box of a work vehicle so to provide enhanced cooling and/or lubrication within the drive box would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for supplying fluid within a work vehicle. The system may generally include a track drive box housing at least one drive component configured to rotationally couple an input shaft associated with track drive box to an output shaft associated with the track drive box. The track drive box may also include first and second inlet ports and an outlet port. The system may also include a first supply conduit in fluid communication with the first inlet port and a second supply conduit in fluid communication with the second inlet port. The first supply conduit may be configured to supply a working fluid to the track drive box and the second supply conduit may be configured to supply a pressurized fluid to the track drive box, wherein the pressurized fluid serves to pressurize an interior of the track drive box, Additionally, the system may include an evacuation conduit in fluid communication with the outlet port that is configured to receive the working fluid as it is expelled from the outlet port. Moreover, when an excess amount of the working fluid is supplied into the track drive box via the first supply conduit, the pressure within the interior of the track drive box may result in at least a portion of the excess amount of the working fluid being expelled from the track drive box via the outlet port.

In another aspect, the present subject matter is directed to a method for supplying fluid to a track drive box of a work vehicle. The method may generally include supplying a working fluid to a first inlet port of the track drive box, wherein the track drive box houses at least one drive component configured to rotationally couple an input shaft associated with the track drive box to an output shaft associated with the track drive box. In addition, the method may include supplying a pressurized fluid to a second inlet port of the track drive box to pressurize an interior of the track drive box and evacuating an excess amount of the working fluid from the pressurized interior of the track drive box via an outlet port of the track drive box.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for supplying fluid to a track drive box of a work vehicle. Specifically, in several embodiments, the system may be configured to supply a working fluid, such as oil and/or any other suitable liquid, to each drive box of the work vehicle in order to provide lubrication and/or cooling for the various internal drive components of the drive box. In doing so, the supply of working fluid to each drive box may be controlled automatically via a suitable control valve. For example, in a particular embodiment, a controller of the work vehicle may be configured to control the operation of the valve such that the working fluid is supplied to each track drive box when a vehicle parameter impacting the internal temperature of the drive box (e.g., the ground speed of the vehicle and/or the fluid temperature within the drive box) exceeds a predetermined threshold. In such an embodiment, upon determining that the monitored parameter(s) exceeds its corresponding threshold(s), the operation of the valve may be automatically controlled so as to provide a steady flow of oil to each track drive box, thereby providing enhanced cooling and/or lubrication.

Additionally, to prevent overfilling of the track drive boxes, each track drive box may include an outlet port for evacuating excess working fluid therefrom. As will be described below, to facilitate such evacuation of the excess working fluid, a supply of pressurized fluid (e.g., low pressure air diverted from an engine component of the work vehicle) may be directed into each track drive box. The pressurized fluid may serve to pressurize the interior of each track drive box, thereby resulting in the evacuation of excess working fluid from the track drive box via its outlet port.

Figure 1:
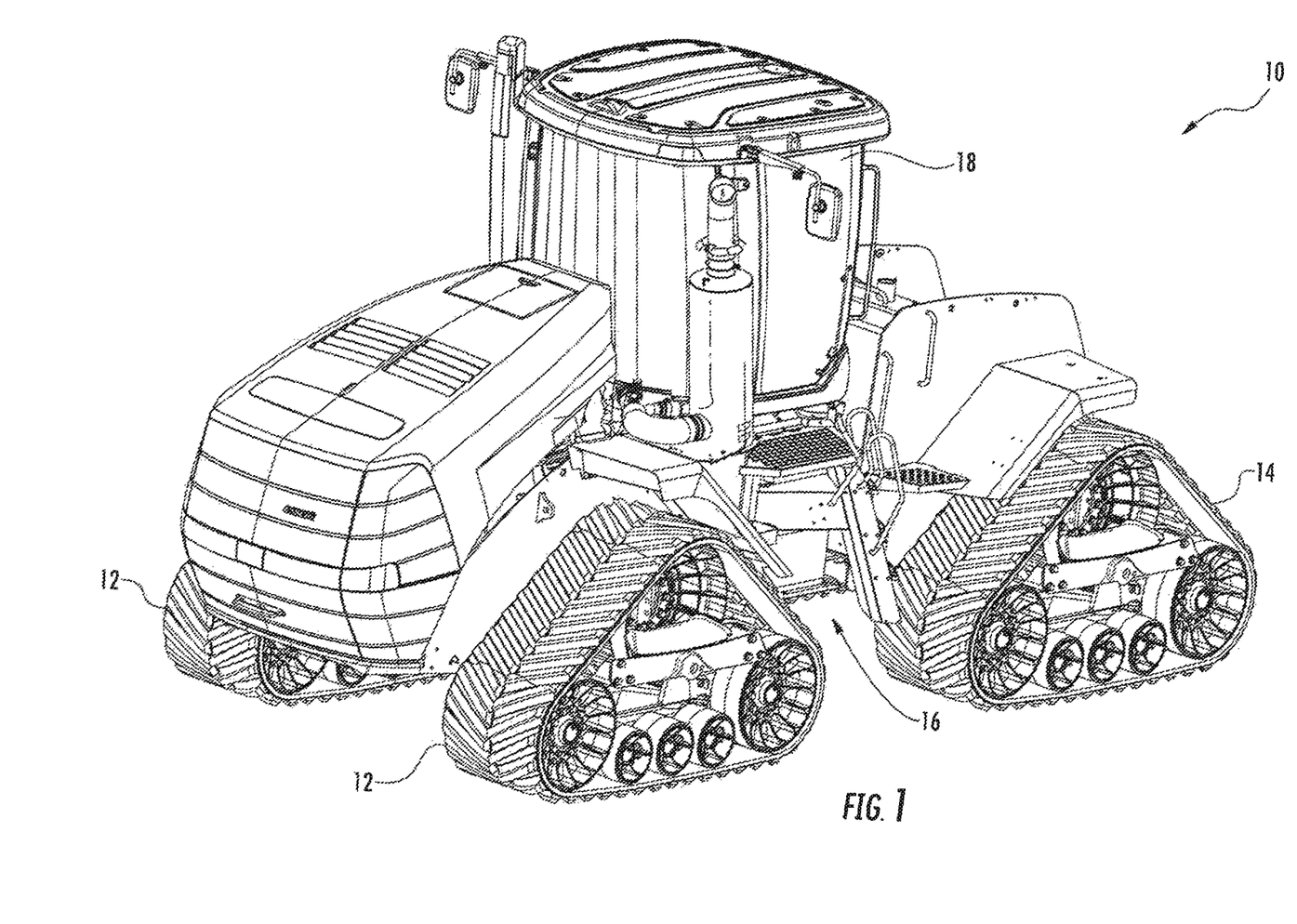
FIG. 1 illustrates a perspective view of one embodiment of a track-driven work vehicle in accordance with aspects of the present subject matter.

Referring now to the drawings, FIG. 1 illustrates a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of front track assemblies 12, a pair or rear track assemblies 14 (only one of which is shown), and a chassis 16 coupled to and supported by the track assemblies 12, 14. As will be described below with reference to FIG. 3, the work vehicle 10 may also include a drivetrain including an engine, a transmission and a drive axle assembly supported by the chassis 16 and in mechanical communication with one or more of the front track assemblies 12 and/or the rear track assemblies 14. Additionally, an enclosed operator's cab 18 is supported by a portion of the chassis 16 and may house various control devices (not shown) for permitting an operator to control the operation of the work vehicle 10.

It should be appreciated that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include an open operator's cab 18 and/or may be configured to be operably coupled to any suitable type of work implement, such as a trailer, spray boom, manure tank, feed grinder, plow and/or the like. Similarly, in another alternative embodiment, as opposed to having four track assemblies, the work vehicle 10 may only include two track assemblies.

Figure 2:
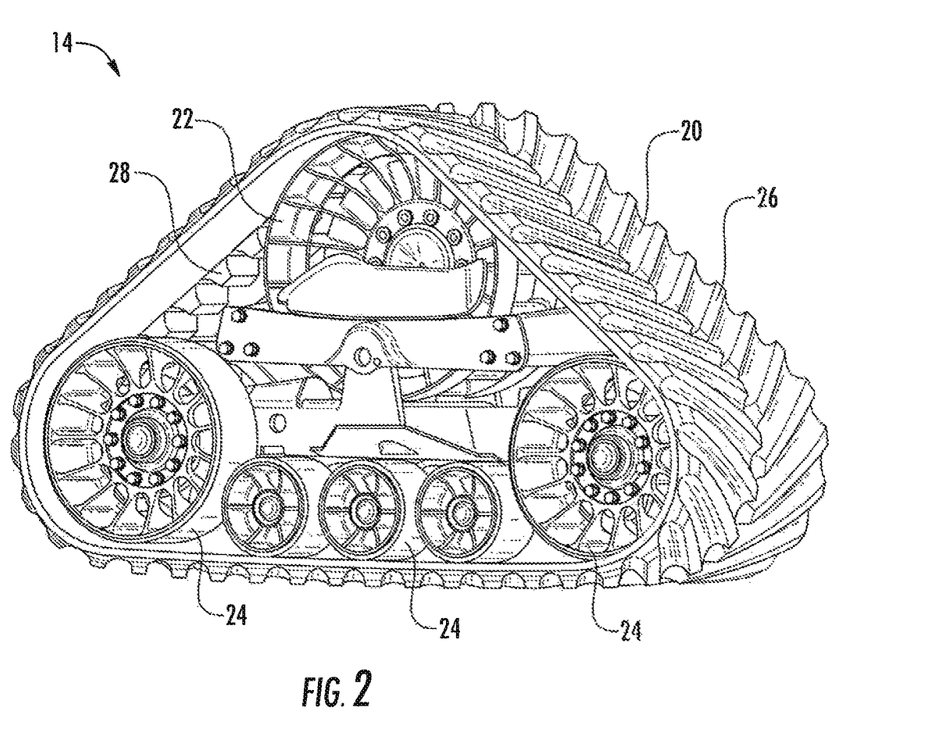
FIG. 2 illustrates a perspective view of one embodiment of a track assembly suitable for use with the work vehicle shown in FIG. 1 in accordance with aspects of the present subject matter.

Referring now to FIG. 2, a perspective view of an exemplary embodiment of one of the rear track assemblies 14 shown in FIG. 1 is illustrated in accordance with aspects of the present subject matter. As shown, the track assembly 14 may generally include a track 20, a drive wheel 22 for mechanically engaging the track 20, and a plurality of idler wheels 24. As will be described below, the drive wheel 22 may be in mechanical communication with the drivetrain of the work vehicle 10 via a track drive box that houses one or more drive components (e.g., one or more suitable gears) for transferring rotational energy from the drivetrain to the drive wheel 22.

As shown in FIG. 2, the track 20 corresponds to an endless or continuously looped track including a tread pattern 26 defined on an outer surface of the track 20. In general, the track 20 may be comprised of any suitable material and may define any suitable tread pattern. For example, in several embodiments, the track 20 may be comprised of modular steel plates linked together, or alternatively may be comprised of a rubber material or a steel-reinforced rubber material. Additionally, as shown in FIG. 2, the track 20 may include a plurality of longitudinally spaced drive lugs 28 extending radially inwardly from an inner surface of the track 20. As is generally understood, the drive lugs 28 may be configured to be mechanically engaged by the drive wheel 22 such that, as the drive wheel 22 is rotated, the track 20 rotates around the endless loop in order to drive the work vehicle 10.

It should be appreciated that the track assembly 14 shown in FIG. 2 is simply illustrated to provide one example of a suitable track assembly configuration. In other embodiments, the track assembly 14 may have any other suitable track-based configuration, including having any suitable number of idler wheels 24 and/or defining any suitable shape.

Figure 3:
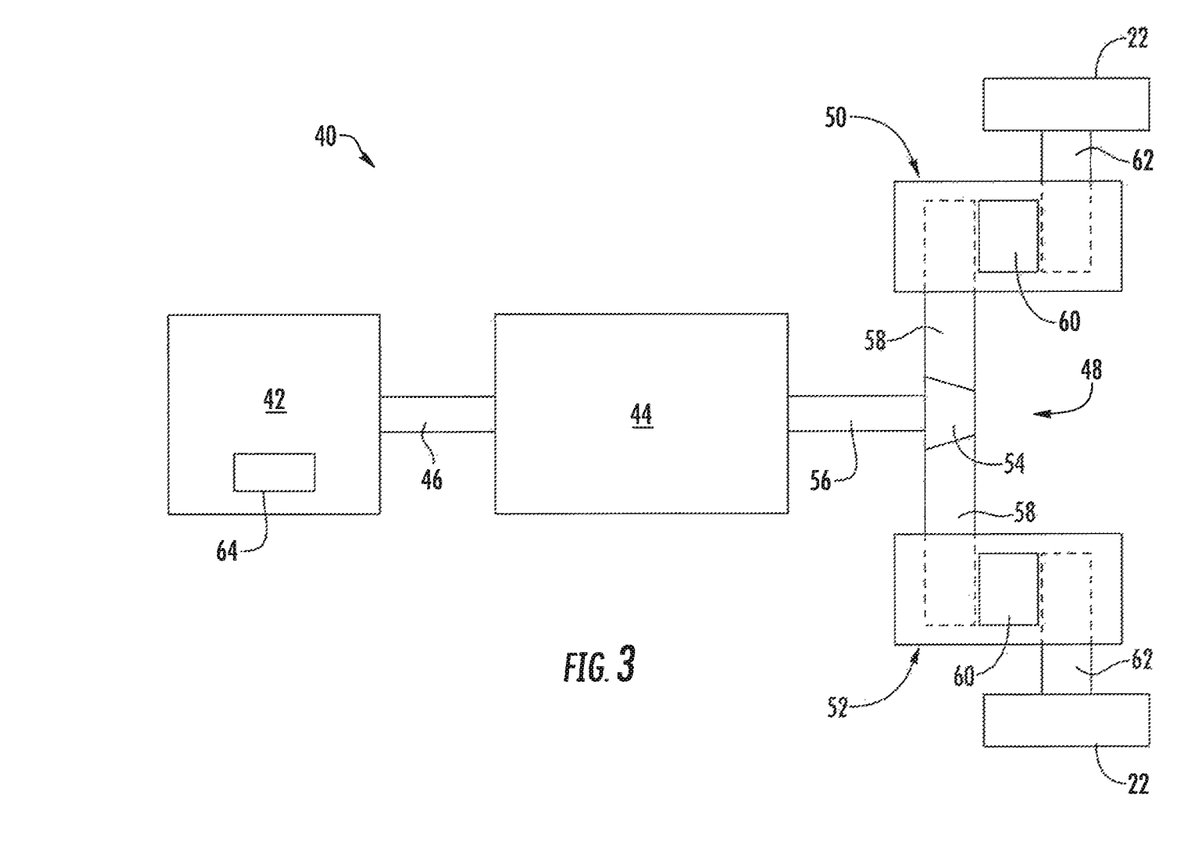
FIG. 3 illustrates a schematic view of one embodiment of various drivetrain components suitable for use with the work vehicle shown in FIG. 1 in accordance with aspects of the present subject matter, particularly illustrating first and second track drive boxes of the drivetrain configured to transfer rotational motion to the drive wheels associated with the track assemblies of the work vehicle.

Referring now to FIG. 3, a schematic view of one embodiment of a drivetrain 40 suitable for transferring power to the drive wheels 22 of one or more of the track assemblies 12, 14 of the work vehicle 10 described above is illustrated in accordance with aspects of the present subject matter. As shown, the drivetrain 40 may generally include an engine 42 and a transmission 44 configured to be mounted on the chassis 16 (FIG. 1) of the work vehicle 10. The transmission 44 may be operably coupled to the engine 42 via one or more shafts 46 and may be configured to provide variably adjusted gear ratios for transferring engine power to the drive wheels 22 via a drive axle assembly 48 and separate track drive boxes 50, 52. As shown, the drive axle assembly 48 may include a differential 54 coupled to an output shaft 56 of the transmission 44 and one or more axle shafts 58 coupled to the differential 54 for transferring power to the respective track drive boxes 50, 52. Thus, the axle shaft(s) 58 may generally correspond to the input shaft(s) associated with each track drive box 50, 52.

In general, each track drive box 50, 52 may correspond to a self-contained gearbox for transferring power between the axle shaft(s) 58 and the drive wheels 22. Thus, as shown, each drive box 50, 52 may include one or more gears 60 configured to rotatably couple the axle shaft(s) 58 to an output shaft 62 for driving the drive wheel 22 of the corresponding track assembly. As such, rotational motion of the axle shaft(s) 58 may be transferred to the respective output shafts 62 of the first and second track drive boxes 50, 52 via the internal gear(s) 60 in order to rotationally drive the drive wheels 22. As indicated above, each drive wheel 22 may be configured to engage its corresponding track 20 for rotating the track around the endless loop defined by the drive wheel 22 and the corresponding idler wheels 24.

It should be appreciated that the engine 42 of the work vehicle 10 may include one or more engine components 64 configured to receive a flow of air therethrough. For example, the engine 44 may include one or more air intake components, such as an intake manifold and/or any other suitable component(s), that receive a flow of intake air for supplying such air to one or more other downstream components of the engine 42. As will be described below, in several embodiments, a portion of the air received by one or more of the engine components 64 may be diverted to the track drive boxes 50, 52 to facilitate the evacuation of any excess oil contained therein.

Figure 4:
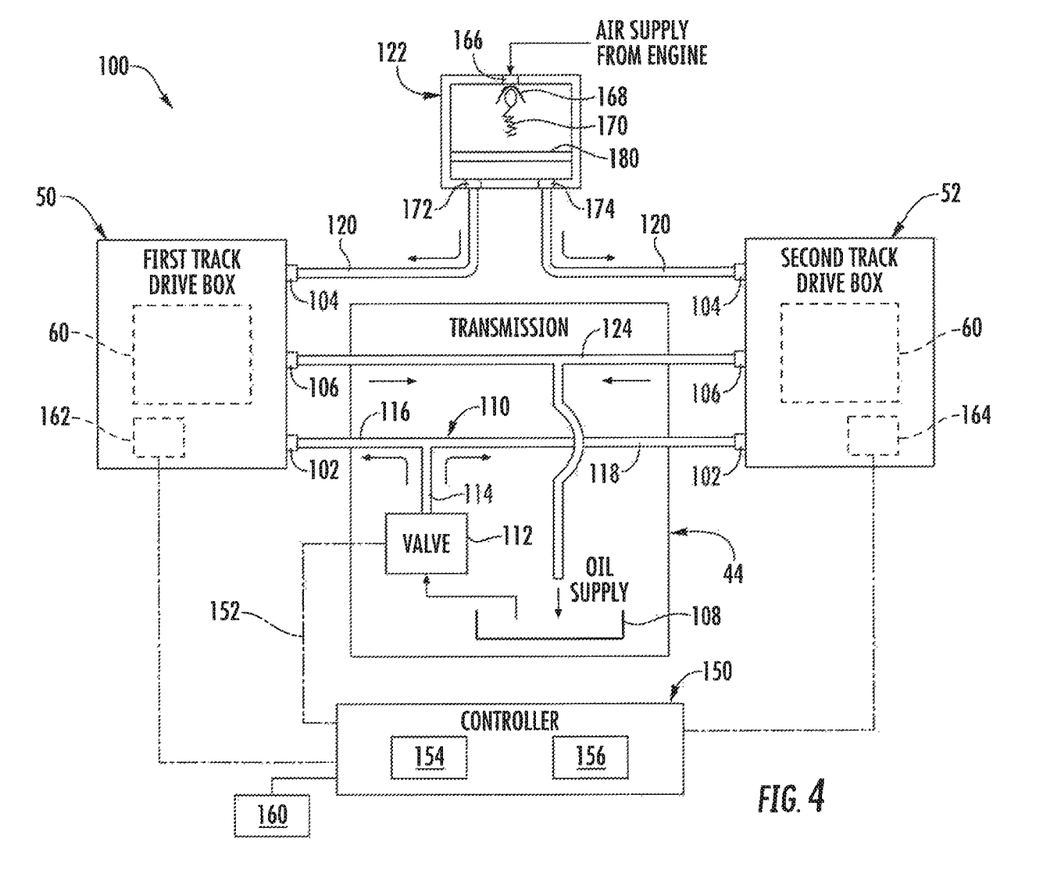
FIG. 4 illustrates a schematic view of one embodiment of a system for supplying fluid to a track drive box of a work vehicle in accordance with aspects of the present subject matter.

Referring now to FIG. 4, a schematic view of one embodiment of a system 100 for supplying fluids to a track drive box 50, 52 of a work vehicle 10 is illustrated in accordance with aspects of the present subject matter. As indicated above, in several embodiments, the disclosed system 100 may be configured to supply a suitable working fluid to the track drive boxes 50, 52 so as to provide lubrication and/or cooling for the internal drive components of each drive box 50, 52. In addition, the system 100 may be configured to supply a flow of pressurized fluid to each track drive box 50, 52 so as to pressurize the interior of each drive box 50, 52, thereby providing a means for evacuating any excess working fluid from the track drive boxes 50, 52.

It should be appreciated that working fluid supplied to the track drive boxes 52, 54 will generally be described herein as corresponding to oil derived from the transmission 44 of the work vehicle 10 and the pressurized fluid will generally be described herein as pressurized air derived from an engine component 64 of the engine 42 (e.g., the intake manifold of the engine 42). However, in other embodiments, the working fluid may correspond to any other suitable liquid that may provide lubrication and/or cooling for the internal drive components of each track drive box 50, 52 and/or may be derived from any other suitable fluid source (e.g., a separate fluid reservoir installed within and/or coupled to the work vehicle 10). Similarly, in alternative embodiments, the pressurized fluid may correspond to any other suitable gas that may be used to increase the internal pressure of or otherwise pressurize the interior of each track drive box 50, 52 and/or may be derived from any other suitable component of the work vehicle (including any component(s) specifically installed within the work vehicle 10 for supplying fluid to the track drive boxes 50, 52).

As shown in FIG. 4, each track drive box 50, 52 may include a plurality of ports 102, 104, 106 for receiving and/or expelling fluid. Specifically, in several embodiments, each track drive box 50, 52 may include a first inlet port 102 for receiving oil from an oil supply reservoir 108 (e.g., the transmission housing) and a second inlet port 104 for receiving pressurized air from the engine component 64. Additionally, each track drive box 50, 52 may include an outlet port 106 for expelling any excess oil contained within such drive box 50, 52.

Additionally, each port 102, 104, 106 may be configured to be in fluid communication with a suitable conduit(s) for supplying fluid to and/or expelling fluid from each track drive box 50, 52. For example, the first inlet port 102 of each track drive box 50, 52 may be in fluid communication with a first supply conduit 110 for supplying oil from the transmission reservoir 108 to the track drive boxes 50, 52. As will be described below, the supply of oil directed from the oil reservoir 108 through the first supply conduit 110 may be controlled via a control valve 112 provided, in fluid communication with the supply conduit 110. As shown in FIG. 4, in one embodiment, the first supply conduit 1.10 may include a common section 114 and first and second supply sections 116, 118 branching off from the common portion 114 to allow oil to be supplied to the respective inlet ports 102 of the first and second track drive boxes 50, 52. In such an embodiment, the various sections of the first supply conduit 110 may be formed by a single conduit or by two or more conduits coupled together to provide a continuous flow path for supplying oil to the track drive boxes 50, 52.

Moreover, the second inlet port 104 of each track drive box 50, 52 may be in fluid communication with a separate second supply conduit 120 for supplying pressurized air derived from the engine component 64 to the track drive boxes 50, 52. As will be described below, the flow of pressurized air through each second supply conduit 120 may be controlled via a valve manifold 122 provided in fluid communication with the supply conduit 120. It should be appreciated that, although each track drive box 50, 52 is shown in FIG. 4 as being in fluid communication with a separate supply conduit 120 extending between the valve manifold 122 and its respective second inlet port 104, the track drive boxes 50, 52 may, instead, be supplied pressurized air from the valve manifold 122 via a common supply conduit having a separate branched sections (e.g., similar to the first supply conduit 110 shown in FIG. 4).

Further, as shown in FIG. 4, the outlet port 106 of each track drive box 50, 52 may be in fluid communication with an evacuation conduit(s) 124 (e.g., a common branched conduit or separate conduits) for transmitting excess oil expelled from the track drive boxes 50, 52 back to the transmission 44. For example, the oil may be directed through the evacuation conduit(s) 124 back to the same reservoir 108 (e.g., the transmission housing) from which it was originally received.

It should be appreciated that the control valve 112 may generally correspond to any suitable valve known in the art that allows for the supply of oil to the track drive boxes 50, 52 to be controlled. However, in several embodiments, the control valve 112 may correspond to an electronically controlled valve, such as a solenoid-activated valve. In such embodiments, the control valve 112 may be configured to be automatically controlled via a suitable controller 150 of the work vehicle 10. For example, as shown in FIG. 4, the vehicle controller 150 may be communicatively coupled to the control valve 112 via a suitable communicative link 152. As such, the controller 150 may be configured to transmit suitable commands (e.g., current commands) to the valve 112 in order to control its operation, thereby allowing the controller 150 to automatically control the flow of oil supplied to the track drive boxes 50, 52.

It should also be appreciated that the controller 150 may generally correspond to any suitable processor-based device known in the art, such as any suitable computing device and/or any combination of computing devices. Thus, in several embodiments, the controller 150 may include one or more processor(s) 154 and associated memory 156 device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 156 of the controller 150 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 156 may generally be configured to store suitable computer-readable instructions that, when implemented by the processor(s) 154, configure the controller 150 to perform various computer-implemented functions, such as the methods described herein. In addition, the controller 150 may also include various other suitable components, such as a communications circuit or module, one or more input/output channels, a data/control bus and/or the like.

In several embodiments, the controller 150 may be configured to monitor one or more vehicle parameters impacting the internal temperature of the track drive boxes 50, 52 and, based on such parameter(s), control the supply of oil to each track drive box 50, 52. For example, as shown in FIG. 4, the controller 150 may be communicatively coupled to one or more sensors 160 for monitoring the ground speed of the work vehicle 10, such as by being coupled to one or more shaft sensors associated with one or more shafts 46, 56, 58, 62 of the drivetrain 40 described above and/or by being coupled to any other suitable sensor(s) configured to directly or indirectly monitor the ground speed of the vehicle 10. In such an embodiment, the controller 150 may be configured to control the operation of the valve 112 such that oil is supplied to the track drive boxes 50, 52 only when the ground speed of the work vehicle 10 exceeds a pre-defined speed threshold. Specifically, it has been found that the internal temperature of each track drive box 50, 52 generally increases with increases in the ground speed of the work vehicle 10. Thus, when the ground speed exceeds the pre-defined speed threshold (thereby indicating that it is likely that the internal temperature within the track drive boxes 50, 52 is relatively high), the controller 150 may be configured to transmit a suitable control command(s) instructing the valve 112 to actuated to an opened state so as to provide a cooling flow of oil to the track drive boxes 50, 52.

In addition to such speed-based control, or as an alternative thereto, the controller 150 may be configured to control the operation of the valve 112 based on the actual fluid temperature within each track drive box 50, 52. For example, as shown in FIG. 4, the controller may be communicatively coupled to one or more suitable temperature sensors 162, 164 (e.g., a first temperature sensor 162 provided in association with the first track drive box 50 and a second temperature sensor 164 provided in association with the second track drive box 52) in order to monitor the fluid temperature of the oil contained within each drive box 50, 52. In such an embodiment, the controller 150 may be configured to control the operation of the valve 112 such that oil is supplied to the track drive boxes 50, 52 only when the fluid temperature within one or both of the drive boxes 50, 52 exceeds a pre-defined temperature threshold.

As indicated above, in several embodiments, the flow of air supplied from the engine (e.g., from the intake manifold or from any other suitable engine component 64) may be controlled via a valve manifold 122. For example, as shown in FIG. 4, the air diverted from the engine component 64 may be initially directed into the valve manifold 122 via an inlet orifice 166 defined in the manifold. In such an embodiment, to prevent backflow, a check valve 168 or other suitable valve may be associated with the inlet orifice 166. For instance, as shown in FIG. 4, the check valve 168 may be configured to be biased into engagement with the inlet orifice 166 (e.g., via a spring 170) such that the valve 168 is opened only due to the pressure of the air being directed into the valve manifold 122 from the engine. As a result, air contained within the valve manifold 122 may be prevented from being expelled from the manifold 122 via the inlet orifice 166.

Additionally, the valve manifold 122 may include an outlet orifice 172, 174 in fluid communication with each second supply conduit 120. Specifically, as shown in FIG. 4, the valve manifold 122 includes a first outlet orifice 172 in fluid communication with the supply conduit 120 configured to direct the pressurized air expelled from the manifold 122 to the first track drive box 50 and a second outlet orifice 174 in fluid communication with the supply conduit 120 configured to direct pressurized air from the manifold 122 to the second track drive box 52. In several embodiments, each outlet orifice 172, 174 may be configured to control the supply of air directed to each respective second inlet port 104. For example, the cross-sectional size and/or shape of each outlet orifice 172, 174 may be selected such that air is supplied to the second inlet port 104 of each track drive box 50, 52 from the valve manifold 122 at a given flow rate and/or pressure.

Moreover, as shown in FIG. 4, the valve manifold 122 may also include a filter or screen 180 positioned between the inlet orifice 166 and the outlet orifices 172, 174 such that the air directed through the valve manifold 122 passes through the screen 180. In general, the screen 180 may be configured to filter out all or a portion of any particulates contained within the air, thereby preventing such particulates from being transferred through the supply conduits 120 and into the track drive boxes 50, 52. For instance, the screen 180 may be formed from a fibrous, porous, mesh material that allows air to pass therethrough while catching/trapping any particulates.

Due to the configuration of the valve manifold 122, a constant stream of pressurized air may be diverted from the engine to the valve manifold 122 and subsequently directed to the track drive boxes 50, 52. As a result, the air received within the track drive boxes 50, 52 may serve to pressurize the interior of each drive box 50, 52, resulting in the evacuation of any excess oil contained within the drive boxes 50, 52 via each respective outlet port 106. As indicated above, such evacuation of the excess oil may prevent overfilling of the track drive boxes 50, 52 as oil is being supplied thereto. For example, in one embodiment, each track drive box 50, 52 may be properly filled with a given amount of oil when the oil reaches a fill line defined directly below the vertical location of each outlet port 106 within its respective track drive box 5, 52. Thus, if an excessive amount of oil is supplied to each track drive box 50, 52 (e.g., such that the oil level extends vertically above the location of each outlet port 106), the internal pressurization of the track drive boxes 50, 52 provided via the air supplied therein may result in the excess oil being forced out of each outlet port 106. The excess oil may then be returned to the oil supply reservoir 108 through the evacuation conduit 124.

It should be appreciated that, as indicated above, the present subject matter is also directed to a method for supplying fluid to a track drive box of a work vehicle. For example, in one embodiment, the method may include supplying a working fluid to a first inlet port 102 of a track drive box 50, 52, supplying a pressurized fluid to a second inlet port 104 of the track drive box 50, 52 so as to pressurize an interior of the track drive box and evacuating an excess amount of the working fluid from the pressurized interior of the track drive box 50, 52 via an outlet port 106 of the track drive box 50, 52.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for supplying fluid within a work vehicle, the system comprising:
   a track drive box housing at least one drive component configured to rotationally couple an input shaft associated with track drive box to an output shaft associated with the track drive box, the track drive box including first and second inlet ports and an outlet port;
   a first supply conduit in fluid communication with the first inlet port, the first supply conduit being configured to supply a working fluid to the track drive box;
   a second supply conduit in fluid communication with the second inlet port, the second supply conduit being configured to supply a pressurized fluid to the track drive box, the pressurized fluid serving to pressurize an interior of the track drive box; and
   an evacuation conduit in fluid communication with the outlet port, the evacuation conduit being configured to receive the working fluid as it is expelled from the outlet port,
   wherein, when an excess amount of the working fluid is supplied into the track drive box via the first supply conduit, the pressure within the interior of the track drive box results in at least a portion of the excess amount of the working fluid being expelled from the track drive box via the outlet port,
   wherein the pressurized fluid comprises air received from an engine component of the work vehicle,
   a valve in fluid communication with the first supply conduit, the valve being configured to control the supply of the working fluid transmitted through the first supply conduit to the track drive box,
   a controller communicatively coupled to the valve, the controller being configured to automatically control the operation of the valve based on a monitored parameter of the work vehicle,
   wherein the monitored parameter corresponds to a fluid temperature within the track drive box, the controller being configured to control the operation of the valve so as to supply the working fluid to the first inlet port when the monitored fluid temperature exceeds a predetermined temperature threshold.

2. The system of claim 1, wherein the monitored parameter corresponds to a ground speed of the work vehicle, the controller being configured to control the operation of the valve so as to supply the working fluid to the first inlet port when the monitored ground speed exceeds a predetermined speed threshold.

3. The system of claim 1, wherein the working fluid comprises oil supplied from an oil supply reservoir of the work vehicle.

4. The system of claim 1, further comprising a valve manifold in fluid communication with the second supply conduit, the valve manifold being configured to control the supply of pressurized fluid directed through the second supply conduit.

5. The system of claim 4, wherein the supply of pressurized fluid directed through the supply conduit is controlled via an outlet orifice defined in the valve manifold.

6. The system of claim 4, wherein the valve manifold includes a check valve configured to prevent backflow of the pressurized fluid received within the valve manifold.

7. The system of claim 4, wherein the valve manifold includes a screen configured to filter particulates out of the pressurized fluid received by the valve manifold.

8. The system of claim 1, wherein the output shaft is rotatably coupled to a drive wheel of a track assembly of the work vehicle, the at least one drive component of the track drive box being configured to transfer rotational motion from the input shaft to the output shaft to rotationally drive the drive wheel, the drive wheel being configured to engage a track of the track assembly.

9. The system of claim 1, wherein the engine component for receiving air from the engine is a manifold.

* * * * *